US012805554B2

(12) United States Patent
White et al.

(10) Patent No.: US 12,805,554 B2
(45) Date of Patent: Nov. 24, 2026

(54) DIETARY COMPOSITION AND METHOD

(71) Applicant: Capsugel Belgium NV, Bornem (BE)

(72) Inventors: Tyler White, Greenwood, SC (US); Kelli Fowler, Greenwood, SC (US); Aouatef Bellamine, Pennington, NJ (US)

(73) Assignee: Capsugel Belgium NV, Bornem (BE)

(*) Notice: Subject to any disclaimer, the term of this patent is extended or adjusted under 35 U.S.C. 154(b) by 763 days.

(21) Appl. No.: 18/014,005

(22) PCT Filed: Jun. 30, 2021

(86) PCT No.: PCT/US2021/039755

§ 371 (c)(1),
(2) Date: Dec. 30, 2022

(87) PCT Pub. No.: WO2022/006200

PCT Pub. Date: Jan. 6, 2022

(65) Prior Publication Data

US 2023/0172246 A1 Jun. 8, 2023

Related U.S. Application Data

(60) Provisional application No. 63/107,071, filed on Oct. 29, 2020, provisional application No. 63/046,880, filed on Jul. 1, 2020.

(51) Int. Cl.

| | |
|---|---|
| ***A23L 33/105*** | (2016.01) |
| ***A23L 33/00*** | (2016.01) |
| ***A23L 33/115*** | (2016.01) |
| ***A23L 33/24*** | (2016.01) |

(52) U.S. Cl.

CPC ........... *A23L 33/105* (2016.08); *A23L 33/115* (2016.08); *A23L 33/24* (2016.08); *A23L 33/30* (2016.08)

(58) Field of Classification Search

CPC ....... A23L 33/105; A23L 33/115; A23L 33/24
See application file for complete search history.

(56) References Cited

U.S. PATENT DOCUMENTS

| | | | | |
|---|---|---|---|---|
| 4,895,935 | A * | 1/1990 | Talebian | C07F 15/0093 536/121 |
| 6,348,502 | B1 | 2/2002 | Gardiner | |
| 7,867,526 | B2 | 1/2011 | Astrup et al. | |
| 2003/0158254 | A1* | 8/2003 | Zerangue | A61K 47/64 514/3.3 |
| 2008/0318945 | A1* | 12/2008 | Casillas | A61P 25/28 514/233.5 |
| 2012/0219621 | A1 | 8/2012 | Alvarez | |
| 2014/0271873 | A1 | 9/2014 | Gogova et al. | |

FOREIGN PATENT DOCUMENTS

| | | | |
|---|---|---|---|
| CA | 2456322 | * 6/2002 | |
| CN | 1771907 | 5/2006 | |
| CN | 103027901 | 4/2013 | |
| CN | 106214655 | 12/2016 | |
| JP | H05304073 | 11/1993 | |
| KR | 20110080685 | 7/2011 | |
| WO | WO2006065234 | 6/2006 | |
| WO | WO2015160842 | 10/2015 | |
| WO | WO-2015160842 A1 | * 10/2015 | A23L 29/262 |

OTHER PUBLICATIONS

Western Washington University (https://ehs.wwu.edu/files/2022-01/Capsaicin.pdf), accessed Oct. 6, 2025 (Year: 2025).*
International Search Report and Written Opinion for PCT/US2021/039755 dated Nov. 17, 2021, 14 pages.
Urbina Stacie L et al: Effects of twelve weeks of capsaicinoid supplementation on body composition, appetite and self-reported caloric intake in overweight individuals11 , Appetite, Academic Press, New York, NY, US, vol. 113, Feb. 21, 2017, pp. 264-273.

* cited by examiner

*Primary Examiner* — Andrew S Rosenthal
(74) *Attorney, Agent, or Firm* — Dority & Manning, P.A.

(57) ABSTRACT

A composition, such as a dietary composition is disclosed containing one or more capsaicinoids contained within a lipid matrix. In one embodiment, the composition contains a liquid capsaicin in addition to a capsaicin wax. The composition is formulated such that when is ingested does not break down in the stomach but instead releases the capsaicin in the small intestines for various dietary benefits, including appetite suppression.

22 Claims, 4 Drawing Sheets

DIETARY COMPOSITION AND METHOD

CROSS REFERENCE TO RELATED APPLICATION

This application claims filing benefit of U.S. Provisional Patent Application Ser. No. 63/046,880, having a filing date of Jul. 1, 2020, U.S. Provisional Patent Application Ser. No. 63/107,071, having a filing date of Oct. 29, 2020, and PCT Patent Application PCT/US2021/039755, having a filing date of Jun. 30, 2021 which are incorporated herein by reference for all purposes.

BACKGROUND

Even with greater emphasis on exercise and diet, obesity continues to be a significant problem around the globe. Although obesity is typically a larger problem in industrialized countries, obesity is also a growing problem in developing countries. Currently, more than half of the adults in the United States are overweight. In addition, greater than 20% of adults are considered obese. Obesity is tied to numerous adverse health conditions, even including certain types of cancer. Consequently, being overweight or obese can not only lead to significant health issues, but can also contribute to a premature death.

The causes of obesity and being overweight are based on numerous factors. For example, obesity can be the result of one's lifestyle, including eating habits and the lack of physical exercise. Obesity can also be tied to inherited genetic characteristics.

There are many different methods for the treatment or prevention of obesity. Perhaps the most commonsense treatment is to monitor the energy intake of the individual. For example, the individual can be placed on a diet where the energy intake is less than the energy expenditure. Another commonsense way to fight obesity is through increased physical activity. Increased physical activity leads to increased energy expenditure.

In addition to the above, various dietary supplements have been proposed in the past in order to assist in improving diet and/or assist in weight loss. Such dietary supplements can include those that reduce appetite or prevent the absorption of fats or carbohydrates. Various dietary compositions have also been proposed that are advertised as raising the metabolic rate of the individual. Some dietary supplements are completely safe while others may cause side effects depending upon the individual.

One appetite suppressant proposed in the past is capsaicin. Capsaicin is a chilly pepper extract that can be very effective in suppressing appetite. Capsaicin extracts, however, when released in the stomach can, in some individuals, cause minor pain and possible cramping. Consequently, capsaicin products on the market typically only contain a very small amount of capsaicin and are designed with a delayed release mechanism so that the capsaicin is primarily released in the small intestines instead of the stomach. For example, one current product on the market is in the form of an enteric coated beadlet containing relatively minor amounts of capsaicin. Due to the dosage levels, this product is relatively ineffective. In addition, the product is very expensive to produce.

In view of the above, a need currently exists for an oral dietary composition containing capsaicin that has a delayed release mechanism so that the capsaicin is absorbed into the body through the small intestine. A need also exists for a delayed released capsaicin product that can contain relatively high amounts of capsaicin for effective appetite suppression or other beneficial health effects.

SUMMARY

In general, the present disclosure is directed to a delayed released composition containing at least one capsaicinoid, such as capsaicin. In one aspect, for instance, the present disclosure is directed to a dietary composition in which significant amounts of capsaicin are contained or dispersed within an edible lipid system that is capable of delivering effective amounts of capsaicin to a mammal for not only appetite suppression but for various other health benefits, including control of metabolic rate and the like. In addition, through the methods and compositions of the present disclosure, the bioavailability of a capsaicinoid can be greatly enhanced in a mammal.

For example, in one embodiment, the present disclosure is directed to a dietary composition comprising lipid multiparticulates that are acid resistant. The lipid multiparticulates comprise a lipid matrix. In accordance with the present disclosure, dispersed within the lipid matrix is a dietary agent. The dietary agent comprises at least one capsaicinoid, such as capsaicin. In accordance with the present disclosure, one or more capsaicinoids can be incorporated into the dietary composition in relatively great amounts. For instance, one or more capsaicinoids can be present in the composition in an amount greater than about 2% by weight, such as in an amount from about 3% to about 20% by weight, such as in an amount of from about 5% to about 15% by weight. The dietary composition can be particularly formulated so as to release the one or more capsaicinoids when the composition is in an environment at pH of about 6.5 or greater. In this manner, the one or more capsaicinoids are not released within the stomach of a mammal when ingested, but instead, are primarily released in the small intestines.

The capsaicin that is incorporated into the dietary composition can be present in various different forms. For example, in one embodiment, a capsaicin wax can be incorporated into the dietary composition. Alternatively, a capsaicin liquid can be incorporated into the dietary composition. In still another embodiment, the dietary composition can contain both a capsaicin wax and a capsaicin liquid. The capsaicin vehicles incorporated into the dietary composition can have a percent active amount of from about 5% to about 90%, such as from about 8% to about 60%.

The dietary composition can be formulated to be a solid at about 23° C. The dietary composition can be configured to be taken orally. For instance, the dietary composition can be in the form of a capsule or a tablet. Each lipid multiparticulate particle, when in the form of a capsule, can have an average diameter of from about 40 microns to about 3000 microns.

As described about, the dietary composition contains a lipid matrix. The lipid matrix, in one aspect, can include at least one low flow point excipient and at least one high flow point excipient. For example, one or more low flow point excipients can be present in the composition in an amount of from about 5% to about 40% by weight and one or more high flow point excipients can be present in the composition in an amount from about 30% to about 85% by weight.

The lipid matrix can contain various and numerous components formulated for a particular purpose. For example, the lipid matrix can contain a fatty alcohol, a fatty acid, a fatty acid ester of a glycol and a poly glycol, a fatty acid ester of glycerol, polyglycerol, a polyglycolized glyceride, a $C_{10}$-$C_{18}$ triglyceridesstearoyl polyoxylglyceride, a lauroyl macrogol-32 glyceride, a caprylocaproyl macrogol-8 glyceride, an oleoyl macrogol-6 glyceride, a linoleoyl macrogol-6 glyceride, myristyl alcohol, lauryl alcohol, capric alcohol, glycerol behenate, glycerol dibehenate, glycerol palmitate, hydrogenated castor oil, stearyl alcohol, behenyl alcohol, palmitic acid, stearic acid, paraffin wax, beeswax, candelilla wax, carnauba wax, polyethoxylated 12-hydroxysteric acid, a propylene glycol fatty acid ester, esterified alpha-tocopheryl polyethylene glycol succinate, a propylene glycol monolaurate ($C_{12}$) ester, polyoxyl 35 castor oil, polyoxyl 40 hydrogenated castor oil, a lecithin, vitamin E, tocopheryl polyethylene glycol succinate (TPGS), a sugar fatty acid ester, a sorbitan fatty acid ester, a polyoxyethylene sorbitan fatty acid ester, a polyoxyethylene-polyoxypropylene copolymer, rosemary extract, ascorbic acid, ascorbyl palmitate, butylated hydroxyanisole (BHA), butylated hydroxy toluene (BHT), propylene glycol, triacetin, isorpropyl myristate, diethylene glycol monoethyl ether, polyethylene glycol, glycerol, mixtures or combinations thereof.

In one embodiment, the lipid matrix contains a wax, a fatty alcohol, and a fatty acid. The wax, for instance, can be candelilla wax, the fatty alcohol can be stearyl alcohol and the fatty acid can be stearic acid. Optionally, the dietary composition can contain a surfactant. The surfactant, for instance, can be a polysorbate, a sulfate surfactant, or mixtures thereof. One example of a sulfate surfactant is sodium laureth sulfate. When present, one or more surfactants can be included in the dietary composition in an amount from about 5% to about 50% by weight. In one aspect, the surfactant can be used in order to control and modify the release properties of the dietary composition when exposed to a neutral to basic environment.

In one aspect, the lipid matrix can contain a disintegrating agent. For example, a cross-linked carboxymethyl cellulose salt can be added to the lipid matrix, such as croscarmellose. The amount of the disintegrating agent or the cross-linked carboxymethyl cellulose incorporated into the dietary composition can generally be greater than about 0.5% by weight, such as greater than about 1% by weight, such as greater than about 3% by weight, such as greater than about 5% by weight, And generally less than about 15% by weight, such as less than about 12% by weight, such as less than about 10% by weight, such as less than about 8% by weight.

The present disclosure is also directed to a method for appetite suppression. The method includes administering to the mammal a dietary composition as described above. In one aspect, the dietary composition can be administered to a mammal such that the dosage of the capsaicinoids is greater than about 2 mg, such as from about 2 mg to about 10 mg, such as from about 2 mg to about 4 mg.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

DETAILED DESCRIPTION

Figure 1:
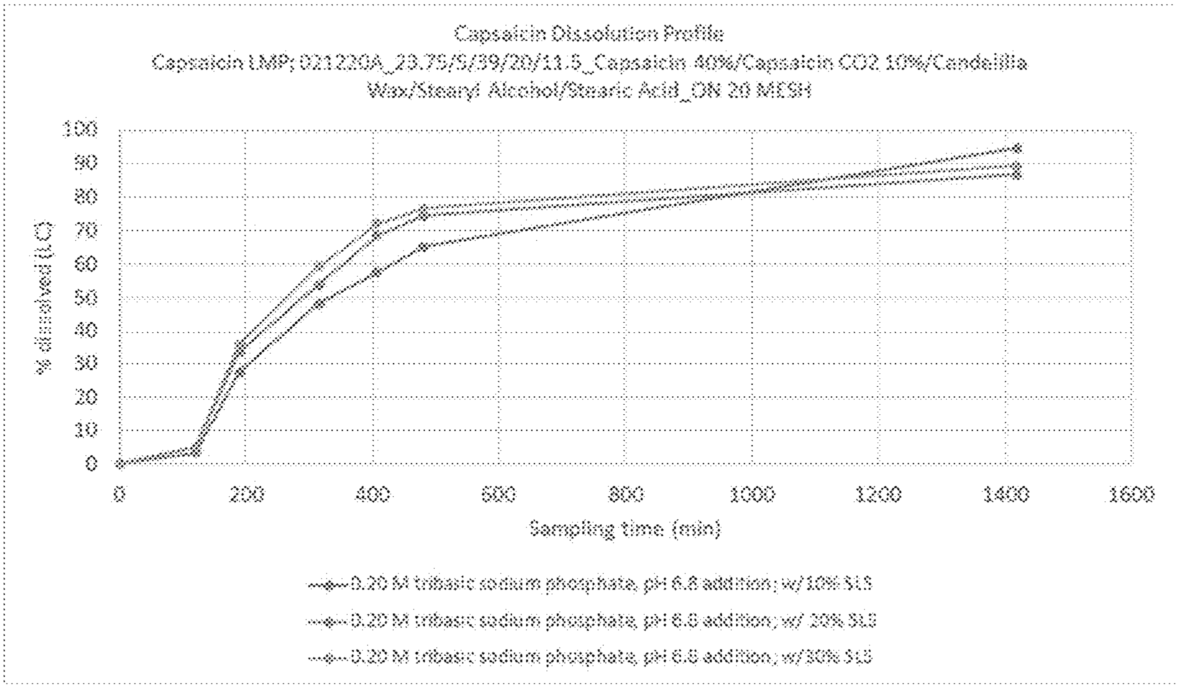
FIG. 1 is a graphical representation of the results obtained in Example No. 1 below.

It is to be understood by one of ordinary skill in the art that the present discussion is a description of exemplary embodiments only and is not intended as limiting the broader aspects of the present disclosure.

The present disclosure is generally directed to lipid multiparticulates containing one or more capsaicinoids, such as capsaicin. The particles can be used to produce capsules, tablets, or can be incorporated into a beverage or other food item. The lipid multiparticulate particles include a lipid matrix that, in one embodiment, can be formulated to release the one or more capsaicinoids when the particles are in contact with a neutral to basic environment.

The following description is exemplary in nature and is not intended to limit the scope, applicability or configuration of the invention in any way. Various changes to the described embodiments may be made in the function and arrangement of the elements described herein without departing from the scope of the disclosure.

As used in this application and in the claims, the singular forms "a," "an," and "the" include the plural forms unless the context clearly dictates otherwise. Additionally, the term "includes" means "comprises." The methods and compositions of the present disclosure, including components thereof, can comprise, consist of, or consist essentially of the essential elements and limitations of the embodiments described herein, as well as any additional or optional ingredients, components or limitations described herein or otherwise useful in nutritional compositions.

Unless otherwise indicated, all numbers expressing quantities of ingredients, properties such as molecular weight, percentages, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

As used herein, "optional" or "optionally" means that the subsequently described material, event or circumstance may or may not be present or occur, and that the description includes instances where the material, event or circumstance is present or occurs and instances in which it does not. As used herein, "w/w %" and "wt %" means by weight as a percentage of the total weight or relative to another component in the composition.

The term "about" is intended to mean approximately, in the region of, roughly, or around. When the term "about" is used in conjunction with a numerical range, it modifies that range by extending the boundaries above and below the numerical values set forth. Unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

The phrase "effective amount" means an amount of a compound that promotes, improves, stimulates, or encourages a response to the particular condition or disorder or the particular symptom of the condition or disorder.

The term "supplement" means a product in addition to the normal diet but may be combined with a mammal's normal food or drink composition. The supplement may be in any form but not limited to a solid, liquid, gel, capsule, or powder. A supplement may also be administered simultaneously with or as a component of a food composition which may comprise a food product, a beverage, a pet food, a snack, or a treat. In one embodiment, the beverage may be an activity drink.

As used herein, the term "flow point" is the temperature at which any portion of the mixture becomes sufficiently fluid that the mixture, as a whole, may be atomized. Generally, a mixture is sufficiently fluid for atomization when the viscosity of the molten mixture is less than 20,000 cp, or less than 15,000 cp, or less than 10,000 cp, less than 5000 cp, or even less than 1000 cp. The viscosity can be measured by a controlled stress rheometer, which measures viscosity as a function of temperature, and may use either a shear-type or rotational rheometer. As used herein, melting point refers to the temperature that marks the midpoint of the transition from a solid crystalline or semi-crystalline state to a liquid state. As measured by DSC, the melting point is the temperature where upon heating the solid material, the maximum exothermic heat flow occurs. In general, melting point will be used in reference to relative pure single component materials such as some actives or essentially single component excipients (e.g. stearyl alcohol) and flow point will be used in reference to multi-component materials or mixtures.

As used herein, the term "semi-solid" is a solid at ambient temperature (23° C.) but becomes a liquid at temperatures above 30° C. or 40° C., or at body temperature.

Unless otherwise indicated, "capsule" means a container suitable for enclosing solids or liquids and includes empty capsule shells and components thereof such as caps and bodies that may be assembled together to form the capsule.

Unless otherwise indicated, "dosage form" refers to a solid composition comprising an active ingredient.

As used herein, the term "particle" refers a portion or quantity of material(s), such as a small portion or quantity of material(s). For example, as provided herein, the term particle may refer generally to a composition containing a core and one or more outer layers surrounding the core. In some embodiments, the particle(s) described may be generally spherical in shape. The term particle as used herein includes or may be used interchangeably with the following: pellet, beadlet, multiparticulates, particulates, spheres, seeds, etc. The term particle as used herein is not limited to only a particle formed by certain methods or processes. Indeed, the particle(s) described herein may be formed by any suitable process. Certain suitable processes include, but are not limited to, spheronization, extrusion, compression, powder layering, liquid layering, pelletization by melt and wet granulation, and combinations thereof. The particle(s) as described herein may be solid or semi-solid particles. In some embodiments, the particles describe herein can include both solid and semi-solid compositions contained on or within the particle itself.

Embodiments of the disclosed composition may include at least one active ingredient or active agent. The compositions may contain one or more active ingredients. As used herein, by "active" or "active ingredient" is meant a drug, medicament, pharmaceutical, therapeutic agent, nutraceutical, or other compound that may be desired to be administered to the body. The active ingredient may be a "small molecule," generally having a molecular weight of 2000 Daltons or less. The active ingredient may also be a "biological active." Biological active ingredients include proteins, antibodies, antibody fragments, peptides, oligonucleotides, vaccines, and various derivatives of such materials. In one embodiment, the active ingredient is a small molecule. In another embodiment, the active ingredient is a biological active. In still another embodiment, the active ingredient is a mixture of a small molecule and a biological active. Also as used herein, the terms "active ingredient", "first active ingredient", "second active ingredient", etc. may be used to denote active ingredients located in different places within the particle, such as those located in the core or those located in the one or more outer layers. However, the terms "first" or "second" do not necessarily denote that the first active ingredient is different from the second active ingredient. For example, in certain embodiments, the active ingredient contained within the core may be the same as the second active ingredient contained within an outer layer disposed on the core. While in certain other embodiments, the active ingredient contained within the core may be different from the second active ingredient contained within an outer layer disposed on the core.

As described above, in one embodiment, the active ingredient can be one or more capsaicinoids that are incorporated or dispersed into a lipid matrix. In one embodiment, the composition of the present disclosure is a dietary composition comprising a lipid multiparticulate that delays the release of one or more capsaicinoids beyond the stomach of a mammal, such as a human, to deliver a higher dose of the capsaicinoid to the mammal with minimal disturbance to the gastrointestinal track. For example, the one or more capsaicinoids can be dispersed in a lipid matrix that is specially formulated to entrap the one or more capsaicinoids and postpone their release. Of particular advantage, the particles of the present disclosure can be constructed to be 100% vegetarian. In addition, the particle size can be carefully controlled and adjusted to fit different purposes, such as when producing capsules, beverages, tablets, and the like.

The compositions and methods of the present disclosure can also increase the bioavailability of the capsaicinoid component when administered to a mammal. For example, by placing the capsaicinoid component into a lipid matrix, the bioavailability of the capsaicinoid can be dramatically increased. Thus, one or more capsaicinoids can be administered to a mammal with greater efficiency and without having to increase doses.

Capsaicinoids, such as capsaicin, can provide various different dietary benefits. Capsaicinoids, such as capsaicin, however, can only be released into the stomach in very minor amounts. Otherwise, the capsaicinoids can caused cramping or other discomfort. Consequently, current products contain capsaicin in very small amounts. In order to prevent release of the capsaicin in the stomach, prior products are also extremely expensive to produce making their daily use cost prohibited.

Lipid products made in accordance with the present disclosure, however, can be made very economically and can contain relatively large amounts of one or more capsaicinoids. The composition of the present disclosure, for instance, can contain one or more capsaicinoids, such as capsaicin, in an amount greater than about 2% by weight, such as in an amount greater than about 3% by weight, such as in an amount greater than about 4% by weight, such as in an amount greater than about 5% by weight, such as in an amount greater than about 6% by weight, such as in an amount greater than about 7% by weight, such as in an amount greater than about 8% by weight. One or more capsaicinoids can be present in the composition in an amount less than about 25% by weight, such as in an amount less than about 20% by weight, such as in an amount less than about 15% by weight, such as in an amount less than about 12% by weight.

Capsaicin, one type of capsaicinoid, is the major pungent ingredient in fruits of the *Capsicum annuum* L genus, which includes red peppers, paprika, and chilies. Capsaicin includes a class of compounds of branched- and straight-chain alkyl vanillylamides. Capsaicin, for instance, is a homovanillic acid derivative, known as 8-methyl-N-vanillyl-6-nonenamid. It is believed that capsaicin modulates cellular growth, collagenase synthesis, and prostaglandin secretion from specific synoviocytes. Capsaicin is also believed to induce mitochondrial swelling, inhibits NADH oxidase, induces apoptosis of transformed cells, stimulates adenylate cyclase, activates protein kinase C, inhibits super oxide anion generation and possibly alters the redox state of the cell.

The various effects of capsaicin are mediated through a specific cellular receptor referred to as a vanilloid receptor. This receptor is shared by resiniferatoxin, an alkaloid derived from plants of the genus *Euphorbia*. Resiniferatoxin is a structural homologue of capsaicin and has been shown to mimic many of the actions of capsaicin. Resiniferatoxin is also structurally similar to phorbol esters (phorbol myristate acetate), which interact with distinct binding sites and activate protein kinase C. Unlike resiniferatoxin, capsaicin has no homology to phorbol myristate acetate. However, capsaicin can activate protein kinase C, suggesting that such activation is not due entirely to the phorbol ester-like moiety on resiniferatoxin.

It is believed that one or more of the above effects are produced through other effects cause capsaicinoids, such as capsaicin, to suppress appetite and make the user not have feelings of hunger. Consequently, the user is less inclined to consume food, reduce calorie intake, and possibly lose or control weight. Because many capsaicinoids can have side effects when released into the stomach, the present disclosure is directed to the use of a particular lipid matrix that prevents release of the one or more capsaicinoids until downstream from the stomach and once the composition experiences a neutral to basic environment.

In general, any suitable capsaicinoid can be incorporated into the composition of the present disclosure. In one aspect, for instance, the composition can contain one or more capsaicins. Capsaicins, for instance, can be produced in different forms depending upon how the capsaicins are extracted from the plant material. For example, in one embodiment, capsaicins can be extracted in the form of a wax. Wax extracts, for instance, can be obtained through various different solvent extraction techniques that may or may not include various different pretreatments of the plant material. Capsaicin extracts in the form of wax can have a relatively high active percentage. For instance, the capsaicin wax can contain actives in an amount greater than about 10% by weight, such as in an amount greater than about 20% by weight, such as in an amount greater than about 30% by weight, such as in an amount greater than about 35% by weight, and generally in an amount less than about 90% by weight, such as in an amount less than about 70% by weight, such as in an amount less than about 50% by weight, such as in an amount less than about 45% by weight.

A capsaicin extract can also be in the form of a liquid. For example, in one embodiment, a liquid extract can be produced through a supercritical extraction process. During a supercritical extraction process, the plant matter is contacted with a supercritical fluid for producing the capsaicin product. The supercritical fluid, for instance, can be carbon dioxide. A liquid extract as described above, generally contains the active ingredient in lower amounts. For instance, the capsaicin liquid extract can contain the active ingredient in an amount greater than about 5% by weight, such as in an amount greater than about 8% by weight, and generally in an amount less than about 40% by weight, such as in an amount less than about 30% by weight, such as in an amount less than about 20% by weight, such as in an amount less than about 15% by weight.

Compositions made in accordance with the present disclosure can contain a wax extract, a liquid extract, or both. In one aspect, for instance, the composition of the present disclosure can contain a combination of a liquid capsaicin extract and a wax capsaicin extract. Using two different extracts, for instance, can allow for better controlled release of the capsaicin when ingested. Consequently, combining two different extracts together can provide various advantages and benefits.

When a capsaicin wax extract is used in conjunction with a capsaicin liquid extract, in one aspect, more of the wax extract is used due to the greater amount of active ingredient. The weight ratio between the wax extract and the liquid extract, for instance, can be from about 20:1 to about 1.5:1, such as from about 10:1 to about 2:1, such as from about 8:1 to about 3:1. The capsaicin wax extract and/or the capsaicin liquid extract can be incorporated into the composition so that the total capsaicinoid active present in the composition is generally greater than about 2%, such as greater than about 4%, such as greater than about 6%, such as greater than about 8%, and generally less than about 25%, such as less than about 20%, such as less than about 15%, such as less than about 12%. It was discovered that these amounts can be incorporated into the liquid matrix of the present disclosure without any substantial amounts being released within the stomach of the user, or in an acidic environment.

In accordance with the present disclosure, one or more capsaicinoids, such as one or more capsaicins, are incorporated into a liquid matrix to form multiparticulates. Examples of liquid matrices are described, for instance, in U.S. Patent Publication No. 2018/0125863, which is incorporated herein by reference. In one embodiment, the lipid matrix is different than forming micelles, microemulsions, macroemulsions, or liposomes.

The lipid matrix used to form the particles of the present disclosure, for instance, can be made from or can include many different lipid-based components, various different acid-resistant components, and the like. Examples of materials that can be used to form the liquid matrix include a fatty alcohol, a fatty acid, a fatty acid ester of a glycol and a poly glycol, a fatty acid ester of glycerol, polyglycerol, a polyglycolized glyceride, a $C_{10}$-$C_{18}$ triglyceridesstearoyl polyoxylglyceride, a lauroyl macrogol-32 glyceride, a caprylocaproyl macrogol-8 glyceride, an oleoyl macrogol-6 glyceride, a linoleoyl macrogol-6 glyceride, myristyl alcohol, lauryl alcohol, capric alcohol, glycerol behenate, glycerol dibehenate, glycerol palmitate, hydrogenated castor oil, stearyl alcohol, behenyl alcohol, palmitic acid, stearic acid, paraffin wax, beeswax, candelilla wax, carnauba wax, polyethoxylated 12-hydroxysteric acid, a propylene glycol fatty acid ester, esterified alpha-tocopheryl polyethylene glycol succinate, a propylene glycol monolaurate ($C_{12}$) ester, polyoxyl 35 castor oil, polyoxyl 40 hydrogenated castor oil, a lecithin, vitamin E, tocopheryl polyethylene glycol succinate (TPGS), a sugar fatty acid ester, a sorbitan fatty acid ester, a polyoxyethylene sorbitan fatty acid ester, a polyoxyethylene-polyoxypropylene copolymer, rosemary extract, ascorbic acid, ascorbyl palmitate, butylated hydroxyanisole (BHA), butylated hydroxy toluene (BHT), propylene glycol, triacetin, isorpropyl myristate, diethylene glycol monoethyl ether, polyethylene glycol, glycerol, mixtures or combinations thereof.

In one embodiment, the liquid matrix is formed from at least one low flow point excipient and at least one high flow point excipient.

For example, in certain embodiments the lipid matrix may contain one or more low-flow point excipients. Low flow point excipients generally include fatty alcohols, fatty acids, fatty acid esters of glycols and poly glycols, fatty acid esters of polyglycerol and fatty acid esters of glycerol (glycerides) with flow points of less than 50° C. When the low flow point excipient is a relatively pure material, the melting point is also less than 50° C. A preferred class of low flow point excipients are low flow point glycerides. By "low flow point" excipient, such as a glyceride, is meant that the melting point of the excipient, such as a glyceride, is less than 50° C. In some embodiments, the low flow point glyceride has a melting point of less than 40° C. In some embodiments, the low-flow point excipient, such as glyceride, is a mixture of compounds, having a flow point of 50° C. or less. In some embodiments, the low-flow point excipient, such as glyceride, has a flow point of 40° C. or less. In some embodiments, the low-flow point glyceride has a low flow point of 30° C. or less. Exemplary low flow point glycerides include polyglycolized glycerides, such as some of the Gelucire products manufactured by Gattefosse, such as Gelucire® 43/01 having a nominal melting point of 43° C. Mixtures of low flow point glycerides are also effective, such as mixtures of Gelucire® 43/01 (C10-C18 triglycerides), Gelucire® 50/13 (stearoyl polyoxylglycerides), Gelucire® 44/14 (lauroyl macrogol-32 glycerides), and mixtures thereof. Other glycerides may also be used, such as fatty acid esters of glycols and poly glycols, and fatty acid esters of polyglycerols.

A function of the low flow point excipient is to ensure that at least a significant portion of the formulation matrix softens when ingested orally by a patient, at the temperature of the GI tract (about 37 for humans). This allows the formulation to break down by digestion in the gastrointestinal (GI) tract, and ultimately to disperse in the GI tract to promote dissolution and absorption of the active. In certain embodiments the low flow point excipient provides a significant portion of the formulation matrix to be present in a non-crystalline liquid or amorphous state when ingested and softened in the GI tract.

Exemplary low flow point fatty alcohols include myristyl alcohol (Tm 38° C.), lauryl alcohol (Tm 23° C.) and capric alcohol (Tm 7° C.).

Exemplary low flow point fatty acids include lauric acid (Tm 44° C.) and oleic acid (Tm 16° C.).

In certain embodiments, the lipid matrix includes a high-flow point excipient. For example, in certain embodiments the lipid matrix may contain one or more high-flow point excipients. By "high flow point" excipient is meant an excipient that has a flow point 50° C. or more. High flow point excipients may also have a melting point above 50° C. High flow point excipients generally include fatty alcohols, fatty acids, fatty acid esters of glycols and poly glycols, fatty acid esters of polyglycerol, fatty acid esters of glycerol (glycerides), waxes, polar waxes and other materials with flow points of greater than 50. A preferred class of high flow point excipients are "high flow point glycerides". By high flow point glyceride is meant that the flow point or melting point of the glyceride is 50° C. or more. In some embodiments, the high flow point glyceride has a melting point of 60° C. or more. In some embodiments, the high-melting point glyceride is a mixture of compounds, having a flow point of 50° C. or more. In some embodiments, the high-flow point glyceride has a flow point of 60° C. or more. In some embodiments, the high flow point glyceride has a flow point of 70° C. or more.

Exemplary high flow point glycerides include glycerol behenate, glycerol dibehenate, glycerol palmitate, hydrogenated castor oil, and mixtures thereof.

Often, the high flow point glyceride is a mixture of compounds that are formulated into a product and sold under a variety of trade names.

Exemplary high flow point and high melt point fatty alcohols include stearyl alcohol (Tm 58° C.) and behenyl alcohol (Tm 71° C.).

Exemplary high flow point and high melt point fatty acids include palmitic acid (Tm 63° C.) and stearic acid (Tm>70° C.).

Exemplary waxes include paraffin wax, beeswax, candelilla wax, carnauba wax, and mixtures thereof.

A function of the high flow point excipient is to aid in the manufacturability of the particles by enabling the particles to congeal at a lower temperature to obtain solid particles during the melt-spray-congeal processing. In certain embodiments the high flow point excipient aids the physical stability of the formulation. In most embodiments, the high flow point excipient is not appreciably digested in the GI tract.

In some embodiments, the lipid matrix of the particles may include other excipients to improve the performance and chemical stability of the formulations. In some embodiments, a dispersing agent is included in the particles. Exemplary dispersing agents include lecithin, glycerin monostearate, ethylene glycol palmitostearate, aluminum oxide, polyethylene alky ethers, sorbitan esters, and mixtures thereof. In one embodiment, the particles include an antioxidant to maintain chemical stability of the active agent. Exemplary antioxidants include vitamin E, tocopheryl polyethylene glycol succinate (TPGS), rosemary extract, ascorbic acid, asorbyl palmitate, butylated hydroxyanisole (BHA), buytlated hydroxytoluene (BHT), and mixtures and combinations thereof.

In some embodiments, a flow aid is used to improve the flow properties of the particles. Exemplary flow aids also known as glidants include calcium silicate, cab-o-sil, silicon dioxide, calcium phosphate tribasic, colloidal silicone dioxide, magnesium silicate, magnesium trisilicate, starch, talc, and other flow aids.

In one aspect, the dietary composition further contains a disintegrating agent. The disintegrating agent, for example, can be a cross-linked carboxymethyl cellulose, such as croscarmellose. Croscarmellose is a cross-linked carboxymethyl cellulose salt. In one aspect, the cross-linked carboxymethyl cellulose can be a sodium salt. In one embodiment, the cross-linked carboxymethyl cellulose can be in the form of fibers or particles. The fibers or particles can form a free-flowing powder that is typically white in color. The cross-linked carboxymethyl cellulose is hydrophilic but also insoluble. Once placed in contact with a liquid, the cross-linked carboxymethyl cellulose wicks the fluid and begins to swell. The swelling action of the cross-linked carboxymethyl cellulose causes the dietary composition to disintegrate. In this manner, the cross-linked carboxymethyl cellulose can be used to control the release of the capsaicinoid.

The ability of the disintegrating agent to affect release of the capsaicinoid can be controlled by controlling the type of cross-linked carboxymethyl cellulose incorporated into the composition and by controlling the amount of the disintegrating agent added to the composition. For example, the ability of the cross-linked carboxymethyl cellulose to swell can depend upon the hydration of the carboxymethyl groups by controlling the degree of substitution within the cross-linked cellulose polymer. The degree of substitution, for instance, can be greater than about 0.5, such as greater than about 0.55, such as greater than about 0.6, such as greater than about 0.65, such as greater than about 0.7, such as greater than about 0.75, such as greater than about 0.8. The degree of substitution is generally less than about 0.9, such as less than about 0.85, such as less than about 0.8, such as less than about 0.75. The degree of substitution can be determined by elemental analysis.

The amount of the disintegrating agent or the cross-linked carboxymethyl cellulose incorporated into the dietary composition can generally be greater than about 0.5% by weight, such as greater than about 1% by weight, such as greater than about 3% by weight, such as greater than about 5% by weight, And generally less than about 15% by weight, such as less than about 12% by weight, such as less than about 10% by weight, such as less than about 8% by weight.

The particles described herein are solid at ambient temperature and are generally spherical in shape. By generally spherical is meant that while most particles are essentially spherical, they do not necessarily form "perfect" spheres. Such particle variations in spherical shapes are known to those persons of ordinary skill in the art of melt-spray-congeal processing and similar particulate forming methods.

The particles may have a size ranging from an average diameter of about 40 μm to about 3000 μm, such as from about 50 μm to about 2500 μm, such as from about 80 μm to about 2000 μm, such as from about 100 μm to about 1500 μm, such as from about 200 μm to about 1000 μm, such as from about 300 μm to about 800 μm. To measure the diameters of the particulates, there are several methods that can be used, including laser diffraction, optical microscopy, and/or SEM.

In certain embodiments, the particles containing the active ingredient and lipid matrix have a flow point above 25° C., such as above 30° C., such as above 35° C., such as above 40° C.

In one embodiment, the lipid matrix composition comprises greater than 50 wt % of the low flow point excipient. In one embodiment, the lipid matrix composition comprises at least 2 wt % of the high flow point excipient. In another embodiment, the lipid matrix composition comprises less than 30 wt % of the high flow point excipient. In another embodiment the mass ratio of the low flow excipient to the high flow excipient is at least 20:1. In still another embodiment, the mass ratio of the low flow excipient to the high flow excipient is at least 15:1. In another embodiment, the mass ratio of the low flow excipient to the high flow excipient is at least 10:1. In another embodiment, the mass ratio of the low flow excipient to the high flow excipient is at least 4:1. In another embodiment, the mass ratio of the low flow excipient to the high flow excipient is at least 3:1. In another embodiment, the mass ratio of the low flow excipient to the high flow excipient is at least 2:1.

In another aspect, the lipid matrix composition contains greater than 50% by weight of one or more high flow point excipients. For example, in one embodiment, the lipid matrix is made exclusively from one or more high flow point excipients and does not contain a low flow point excipient. One or more high flow point excipients, for instance, can be present in the lipid matrix in an amount greater than about 40% by weight, such as an amount greater than about 50% by weight, such as in an amount greater than about 60% by weight, such as in an amount greater than about 65% by weight, such as in an amount greater than 70% by weight, and generally in an amount less than about 98% by weight, such as in an amount less than about 95% by weight, such as in an amount less than about 90% by weight, such as in an amount less than about 80% by weight, such as in an amount less than about 70% by weight. When greater amounts of high flow point excipients are present, one or more low flow point excipients may be present in the composition in an amount less than about 30% by weight, such as in an amount less than about 20% by weight, such as in an amount less than about 10% by weight and generally in an amount greater than 1% by weight, such as in an amount greater than about 4% by weight. The mass ratio of the high flow point excipients to the low flow point excipients can be from about 100:1 to about 1:1, such as from about 50:1 to about 10:1, such a from about 20:1 to about 5:1.

In one particular embodiment, the lipid matrix contains a wax combined with a fatty acid alcohol and a fatty acid. The wax, for instance, can comprise candelilla wax. The fatty alcohol, on the other hand, can be stearyl alcohol, while the fatty acid can be stearic acid. For example, the wax, such as candelilla wax, can be present in the composition in an amount greater than about 20% by weight, such as in an amount greater than about 25% by weight, and generally in an amount less than about 50% by weight, such as in an amount less than about 45% by weight. The fatty alcohol, on the other hand, can generally be present in an amount greater than about 10% by weight, such as in an amount greater than about 12% by weight, and generally in an amount less than about 25% by weight, such as in an amount less than about 22% by weight, such as in an amount less than about 18% by weight. The fatty acid, on the other hand, can be present in the composition in an amount greater than about 3% by weight, such as in an amount greater than about 5% by weight, such as in an amount greater than 7% by weight, and generally in an amount less than about 15% by weight, such as in an amount less than about 12% by weight, such as in an amount less than about 10% by weight.

The lipid matrix may also comprise a dispersing agent. In one embodiment, the lipid matrix is comprised of from 0 wt % to 20 wt %, such as from 0.01 wt % to 20 wt %, of a dispersing agent. In another embodiment, the lipid matrix is comprised of from 2 wt % to 10 wt % of a dispersing agent.

The lipid matrix may also comprise an antioxidant. In one embodiment, the lipid matrix comprise from 0 wt % to 20 wt %, such as from 0.01 wt % to 10 wt %, of an antioxidant. In one embodiment, the lipid matrix comprise from 1 wt % to 5 wt % of an antioxidant.

The lipid matrix may also comprise a flow aid. In one embodiment, the lipid matrix may comprise from 0 wt % to 5 wt %, such as from 0.01 wt % to 5 wt %, of a flow aid. In another embodiment, the lipid matrix may comprise from 0.5 wt % to 2 wt % of a flow aid.

The lipid matrix described herein may be formulated by any suitable process. In some embodiments, the matrix may be formulated by a suitable melt-spray-congeal process.

A molten mixture is formed by mixing and heating the lipid matrix compositions as previously described. "Molten mixture" means that the mixture of an active ingredient and lipid matrix materials are sufficiently mixed and heated to fluidize the mixture sufficiently to allow it to be atomized into droplets. Generally, the mixture is molten in the sense that it will flow when subjected to one or more forces such as pressure, shear, and centrifugal force, such as that exerted by a centrifugal or spinning-disk atomizer.

Once the molten mixture has been formed, it is delivered to an atomizer that breaks the molten mixture into small droplets. Virtually any method can be used to deliver the molten mixture to the atomizer. In certain embodiments of the disclosed methods the molten mixture is delivered to the atomizer by use of pumps and/or various types of pneumatic devices such as pressurized vessels or piston pots or extruder. In certain embodiments the molten mixture is maintained at an elevated temperature during delivery to the atomizer to prevent its solidification and to keep it in a flowable state.

When a centrifugal atomizer (also known as rotary atomizers or spinning-disk atomizer) is used, the molten mixture is fed onto a rotating surface, where it spreads outward and flows by centrifugal force. The rotating surface may take several forms, examples of which include a flat disk, a cup, a vanned disk, and a slotted wheel. The surface of the disk may also be heated to aid in atomization of the molten mixture or cooled to aid in the solidification of the cores containing the lipid matrix. Several mechanisms of atomization are observed with flat-disk and cup centrifugal atomizers, depending on the flow of molten mixture to the disk, the rotation speed of the disk, the diameter of the disk, the viscosity of the feed, and the surface tension and density of the feed. At low flow rates, the molten mixture spreads out across the surface of the disk and when it reaches the edge of the disk, forms a discrete droplet, which is then flung from the disk.

Once the molten mixture has been atomized, the droplets are congealed, typically by contact with a gas at a temperature below the solidification temperature of the composition. Typically, it is desirable that the droplets are congealed in less than 60 seconds, less than 10 seconds, or even in less than 1 second. In certain embodiments congealing at ambient temperature using an ambient temperature cooling medium, results in sufficiently rapid solidification of the droplets. However, as certain embodiments of the disclosed compositions are comprised of at least 50 wt % of a low flow point excipient, it is often preferred to utilize a cooling medium that is at a temperature that is at least 10° C. below ambient temperature. For some embodiments, it is preferred to utilize a cooling medium that is at least 20° C. below ambient temperature.

In one aspect, one or more surfactants can optionally be incorporated into the composition. Surfactants can be incorporated into the composition for various reasons. It was discovered that some surfactants can actually facilitate control of the delayed release function of the composition. In some embodiments, surfactants and co-surfactants may be included in the compositions, Exemplary surfactants and co-surfactants include polyethoxylated 12-hydroxysteric acid, also known as PEG15 hydroxystearate (Kolliphor® HS-15), propylene glycol monocaprylate ($C_3$) esters (Caproyl™ 90), esterified alpha-tocopheryl polyethylene glycol succinate (MOS), mono, di, tricaprylic ($C_8$) and capric acid ($C_{10}$) esters of glycerol and mono and diesters of PEG400 (Labrasol®), Propylene glycol monolaurate ($C_{12}$) esters (Labrafil® M1944CS), Polyoxyl 40 hydrogenated castor oil (Kolliphor® RH40), lecithins, and mixtures thereof.

In one embodiment, the surfactant incorporated into the composition can be a polysorbate, a sulfate surfactant, or mixtures thereof, Sulfate surfactants include, for instance, salts of fatty acids sulfates. For example, in one embodiment, the surfactant can be sodium laureth sulfate.

The amounts of surfactants incorporated into the composition can vary widely depending upon the reason for adding the surfactant or the desired result. In general, when included in the composition, one or more surfactants can be present in an amount greater than about 1% by weight, such as in an amount greater than about 3% by weight, such as in an amount greater than about 7% by weight, such as in an amount greater than about 10% by weight, such as in an amount greater than about 15% by weight, such as in an amount greater than about 20% by weight, such as in an amount greater than about 25% by weight, such as in an amount greater than about 30% by weight. One or more surfactants are generally present in the composition in an amount less than about 50% by weight, such as in an amount less than about 40% by weight, such as in an amount less than about 30% by weight, such as in an amount less than about 20% by weight, such as in an amount less than about 10% by weight.

In some embodiments, the one or more particles provided herein may be formulated into any suitable dosage formulation. For example, in certain embodiments, the one or more particles provided herein may be placed into a capsule for delivery by oral ingestion. Exemplary capsules include hard gelatin capsules, soft gelatin capsules, HPMC capsules, as well as capsules made from other materials. The one or more particles may be suspended in an aqueous-based matrix or an oil-based matrix within the capsule itself. In certain embodiments where the particles are suspended in an aqueous-based matrix or an oil-based matrix, the aqueous-based matrix or oil-based matrix may additionally include one or more active ingredients. In certain embodiments, the one or more particles may be contained within a monolithic enteric capsule suitable for providing a modified release profile when ingested.

Capsules normally include a shell filled with one or more specific substances. The shell itself may be a soft or a hard capsule shell. Hard capsule shells are generally manufactured using dip molding processes, which can be distinguished into two alternative procedures. In the first procedure, capsules are prepared by dipping stainless-steel mold pins into a solution of polymer, optionally containing one or more gelling agents (e.g. carrageenans) and co-gelling agents (e.g. inorganic cations). The mold pins are subsequently removed, inverted, and dried to form a film on the surface. The dried capsule films are then removed from the molds, cut to the desired length, and then the telescoping fit caps and bodies are assembled together, printed, and packaged. In the second procedure, no gelling agents or co-gelling agents are used and film-forming polymer solution gelification on the molding pins is thermally induced by dipping pre-heated molding pins into the polymer solution. This second process is commonly referred to as thermogellation, or thermogelling dip molding. The aforementioned manufacturing processes involve the use of solutions of the different ingredients that are needed for the making the telescoping fit hard capsule shells.

Hard capsules may be filled with active ingredients, such as the particles described herein, via procedures known in the art. Typically, active ingredients are combined with various compatible excipients for ease of fill. The resulting fill may be a dry powder, a granulation, particles, lipid particles, a suspension, or a liquid. Additionally, stable, filled hard capsules have advantages over other dosage delivery forms such as liquids and solid tablets. Certain active ingredients may be difficult to formulate into dry granules or may be otherwise incompatible with the tableting process. Another consideration is improved patient compliance for taste-masking and ease of swallowing, i.e., capsules being preferred by consumers over tablets. For example, in some embodiments, provided is a pharmaceutical composition that contains a capsule filled with the one or more particles disclosed herein. In some embodiments, the one or more particles have not been enterically coated for modified release or gastric protection.

In certain other embodiments, the one or more particles can be administered orally as a solid, liquid, suspension, or gas. The composition of particles may be administered via buccal or sublingual administration. In one embodiment, the one or more particles may be administered as a capsule, tablet, caplet, pill, troche, drop, lozenge, powder, granule, syrup, tea, drink, thin film, seed, paste, herb, botanical, and the like.

Dosage amounts for the capsaicinoids when combined into a composition of the present disclosure can vary depending upon the type of patient and the desired result. In one embodiment, for instance, one or more capsaicinoids can be administered to a mammal, such as a human, at dosage levels of greater than about 2 mg, such as greater than about 3 mg, such as greater than about 4 mg, such as greater than about 5 mg, and generally less than about 10 mg, such as less than about 8 mg, such as less than about 6 mg. In one embodiment, the dosage level of one or more capsaicinoids can be from about 2 mg to about 4 mg.

The present disclosure may be better understood with reference to the following example.

EXAMPLE

Example No. 1

Various formulations were made in accordance with the present disclosure and tested for release.

The base formulation tested contained approximately 23.75 weight % capsaicin wax containing 40% active capsaicin. The composition also contained about 5 weight % liquid capsaicin extract. The liquid capsaicin extract was carbon dioxide extracted and contained 10% active. The composition further contained about 39% by weight candelilla wax, about 20% by weight stearyl alcohol, and about 11.5% by weight stearic acid.

A surfactant, sodium laureate sulfate (SLS), was added to the base formulation in an amount of 10% by weight, 20% by weight, and 30% by weight. Each resulting composition was formed into particles in accordance with the present disclosure. The particles had a particle size of from about 200 to about 800 microns.

The compositions described above were placed in an acidic solution and held in the solution for 2 hours. After 2 hours, 0.2 M tribasic sodium phosphate was added (pH of 6.8). The release of capsaicin was monitored over 24 hours. The results were illustrated in FIG. 1. Referring to FIG. 1, the graph illustrates that release of capsaicin generally does not begin in the first two hours. After the pH is increased, however, the capsaicin is released over a four hour period.

Example No. 2

The procedure of Example No. 1 was repeated except the surfactant was replaced with a disintegrating agent. The disintegrating agent used was croscarmellose. The base formulation tested contained approximately 26.25 weight % capsaicin wax containing 40% active capsaicin. The composition also contained about 5 weight % liquid capsaicin extract. The liquid capsaicin extract was carbon dioxide extracted and contained 10% active. The composition further contained about 33% to about 38% by weight candelilla wax, about 25% to about 30% by weight stearic acid. Croscarmellose was added at 1% by weight, 5% by weight, and 10% by weight. The amount of candelilla wax and stearic acid were varied based on the amount of croscarmellose added.

Each resulting composition was formed into particles in accordance with the present disclosure. The particles had a particle size of from about 200 to about 800 microns.

Figure 2:
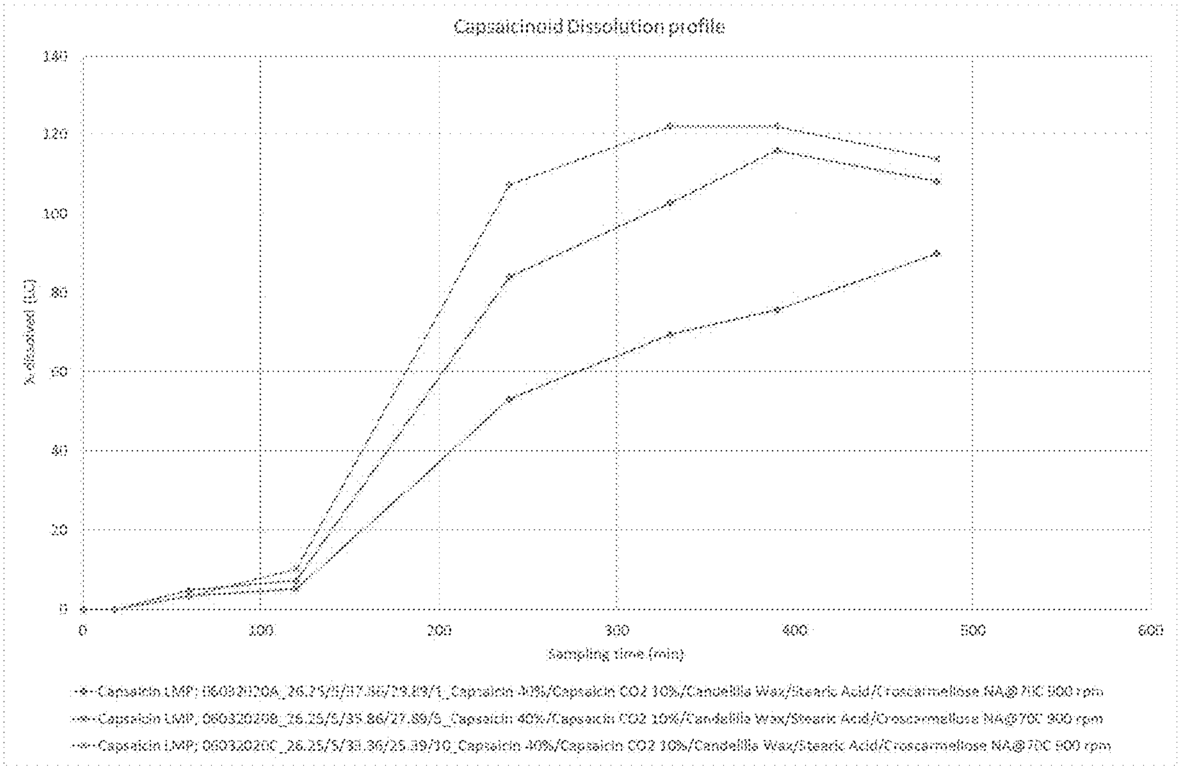
FIG. 2 is a graphical representation of the results obtained in Example No. 2 below.

Referring to FIG. 2, the graph illustrates the release of capsaicin from the different formulations.

Example No. 3

In this example, the bioavailability (area under the curve) of capsaicin with and without a lipid multiparticulate (LMP) formulation was investigated.

Rats were randomly assigned into four groups (n=7) for each of the capsaicin formulations and were kept in an isolated room at a constant temperature between 21 and 23° C., controlled humidity (50+10%) and subjected to cycles of 12 hours: 12 h artificial light/darkness. The rats fasted for 12 h with free access to water and were orally administered by gastric intubation (5 ml/kg bw) as follows:

1) Control group: water;
2) Capsaicin group 1 ("CAPS 1"): 30% w/v solution of 0.2 mg/kg bw of capsaicin.
3) Capsaicin group 2 ("CAPS 2"): 30% w/v solution of 1 mg/kg bw of capsaicin.
4) Capsaicin group 3 ("LMP CAPS 1"): 30% w/v solution of 0.4 mg/kg bw of capsaicin in LMP (assuming 50% incorporation)
5) Capsaicin group 4 ("LMP CAPS 2"): 30% w/v solution of 2 mg/kg bw of capsaicin in LMP (assuming 50% incorporation)

Blood was collected 15 min before oral gavage and after the corresponding oral administration of each group at different time lapses (30', 60', 90', 120', 180'). Blood levels of capsaicin were measured using HPLC. Areas under the curve (AUC) were calculated.

Figure 3:
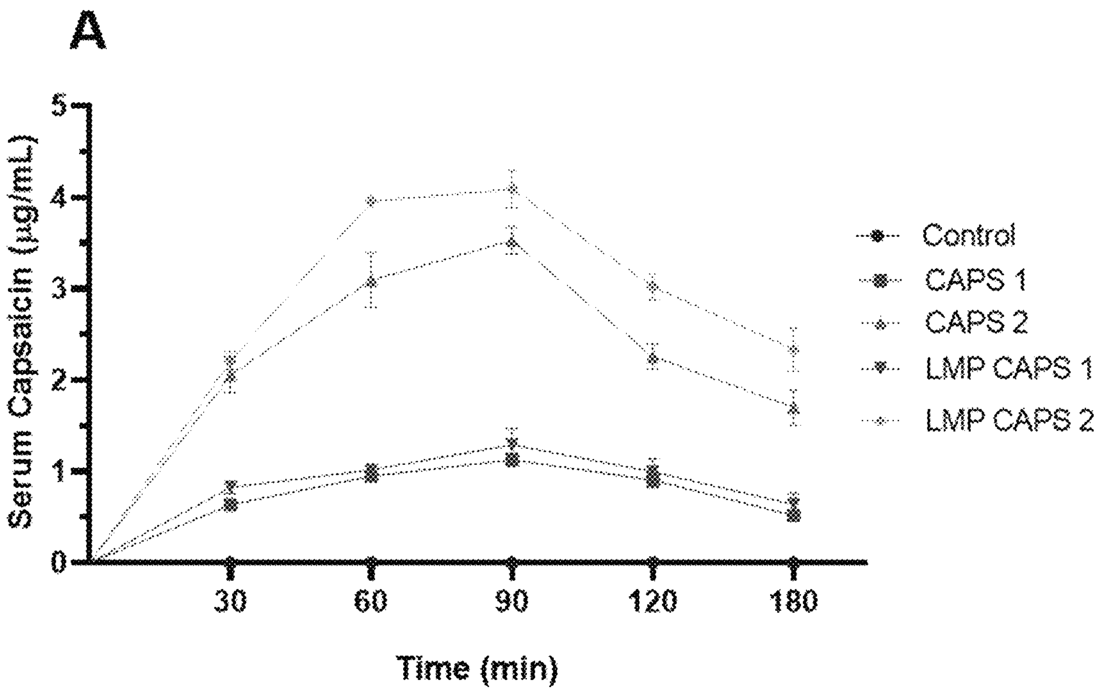
FIG. 3 is a graphical representation of the results obtained in Example No. 3 below.
Figure 4:
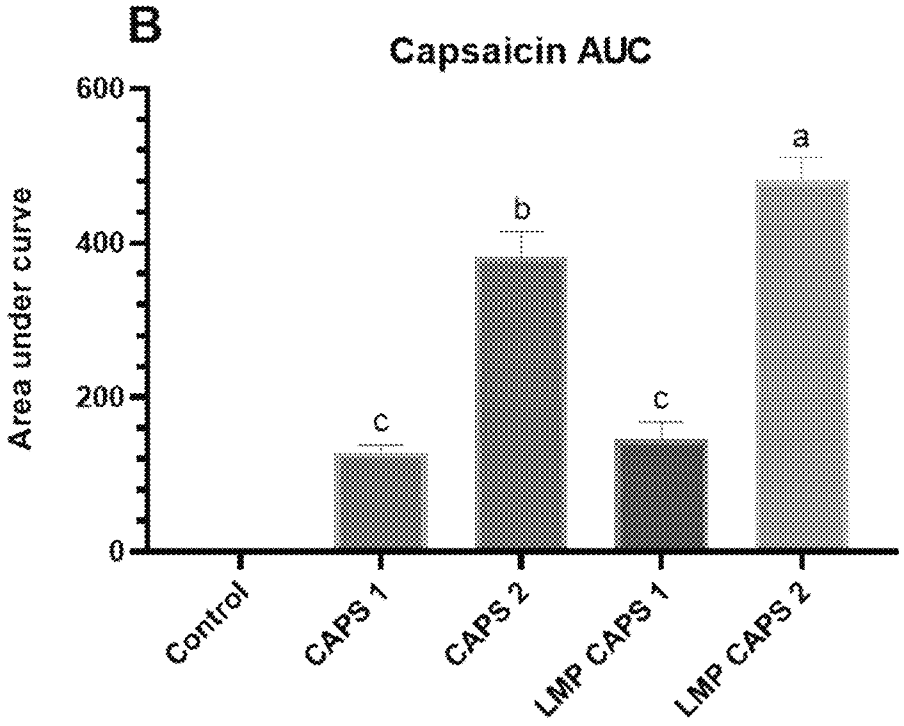
FIG. 4 is a graphical representation of the results obtained in Example No. 3 below.

The results are illustrated in FIGS. 3 and 4. As shown, the bioavailability of capsaicin was enhanced.

These and other modifications and variations to the present disclosure may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

What is claimed is:

1. A dietary composition comprising:

lipid multiparticulate particles that are acid resistant, the lipid multiparticulate particles comprising a lipid matrix, and wherein dispersed in the lipid matrix is a dietary agent, the dietary agent comprising a mixture of a capsaicin wax and a capsaicin liquid, wherein a weight ratio of the capsaicin wax to the capsaicin liquid is from about 20:1 to about 1.5:1, the dietary agent being present in the lipid multiparticulate particles in an amount greater than about 2% by weight.

2. A dietary composition as defined in claim 1, wherein the capsaicin wax comprises an active ingredient in an amount greater than about 10% by weight and less than about 90% by weight.

3. A dietary agent as defined in claim 1, wherein the capsaicin liquid comprises an active ingredient in an amount greater than about 5% by weight and less than about 40% by weight.

4. A dietary composition as defined in claim 1, wherein the dietary agent is present in the lipid multiparticulate particles in an amount from about 3% to about 20% by weight.

5. A dietary composition as defined in claim 1, wherein the composition is formulated so as to release the dietary agent when the dietary composition is exposed to an environment at a pH of about 7 or greater.

6. A dietary composition as defined in claim 1, wherein the lipid multiparticulate particles are a solid at 23° C.

7. A dietary composition as defined in claim 1, wherein the dietary composition is in the form of a capsule or a tablet.

8. A dietary composition as defined in claim 1, wherein the lipid multiparticulate particles have an average particle size of from about 40 microns to about 3000 microns.

9. A dietary composition as defined in claim 1, wherein the lipid matrix comprises at least one low flow point excipient and at least one high flowpoint excipient.

10. A dietary composition as defined in claim 1, wherein the lipid matrix comprise a fatty alcohol, a fatty acid, a fatty acid ester of a glycol and a poly glycol, a fatty acid ester of glycerol, polyglycerol, a polyglycolized glyceride, a $C_{10}$-$C_{18}$ triglyceridesstearoyl polyoxylglyceride, a lauroyl macrogol-32 glyceride, a caprylocaproyl macrogol-8 glyceride, an oleoyl macrogol-6 glyceride, a linoleoyl macrogol-6 glyceride, myristyl alcohol, lauryl alcohol, capric alcohol, glycerol behenate, glycerol dibehenate, glycerol palmitate, hydrogenated castor oil, stearyl alcohol, behenylalcohol, palmitic acid, stearic acid, paraffin wax, beeswax, candelilla wax, carnauba wax, polyethoxylated 12-hydroxysteric acid, a propylene glycol fatty acid ester, esterified alpha-tocopheryl polyethylene glycol succinate, a propylene glycol monolaurate ($C_{12}$) ester, polyoxyl 35 castor oil, polyoxyl 40 hydrogenated castor oil, a lecithin, vitamin E, tocopheryl polyethylene glycol succinate (TPGS), a sugar fatty acid ester, a sorbitan fatty acid ester, a polyoxyethylene sorbitan fatty acid ester, a polyoxyethylene-polyoxypropylene copolymer, rosemary extract, ascorbic acid, ascorbylpalmitate, butylated hydroxyanisole (BHA), butylated hydroxy toluene (BHT), propylene glycol, triacetin, isorpropyl myristate, diethylene glycol monoethyl ether, polyethylene glycol, glycerol, mixtures or combinations thereof.

11. A dietary composition as defined in claim 1, wherein the lipid matrix comprises a wax, a fatty alcohol, and a fatty acid.

12. A dietary composition as defined in claim 11, wherein the wax comprises candelilla wax, wherein the fatty alcohol comprises stearyl alcohol, and wherein the fatty acid comprises stearic acid.

13. A dietary composition as defined in claim 1, wherein the lipid matrix further contains a surfactant.

14. A dietary composition as defined in claim 13, wherein the surfactant comprises a polysorbate, a laureth sulfate, or mixtures thereof.

15. A dietary composition as defined in claim 9, wherein the low flow point excipients are present in the composition in an amount of from about 0% to about 20% by weight and wherein the high flow point excipients are present in the composition in an amount of from about 30% to about 85% by weight.

16. A dietary composition as defined in claim 1, wherein the lipid matrix further comprises a cross-linked carboxymethyl cellulose salt.

17. A dietary composition as defined in claim 16, wherein the cross-linked carboxymethyl cellulose salt is present in the dietary composition in an amount of from about 0.5% to about 15% by weight.

18. A method for suppressing appetite comprising:

orally administering to a mammal a dietary composition comprising lipid multiparticulate particles, the lipid multiparticulate particles comprising a lipid matrix and wherein dispersed in the lipid matrix is a dietary agent, the dietary agent comprising a mixture of a capsaicin wax and a capsaicin liquid, wherein a weight ratio of the capsaicin wax to the capsaicin liquid is from about 20:1 to about 1.5:1, each dosage administered to the mammal containing the dietary agent in an amount from about 2 mg to about 10 mg.

19. A method as defined in claim 18, wherein the dietary composition is formulated such that greater than 50% of the dietary agent is released from the dietary composition in the small intestines of the mammal.

20. A method as defined in claim 18, wherein the dietary agent is present in the dietary composition in an amount of from about 2% to about 20% by weight.

21. A method as defined in claim 18, wherein the dietary agent comprises a capsaicin that was extracted using a supercritical fluid.

22. A method as defined in claim 18, wherein the dietary composition is administered to the mammal in a manner that increases a bioavailability of the dietary agent in the mammal.

* * * * *